United States Patent
Robèrt et al.

(10) Patent No.: US 12,378,021 B2
(45) Date of Patent: Aug. 5, 2025

(54) ROBOT TOOL AND METHOD FOR COIL PACKAGING

(71) Applicant: Lamiflex Group AB, Nyköping (SE)

(72) Inventors: Adrian Robèrt, Nyköping (SE); Petter Järte, Nyköping (SE); Marcus Forssblad, Nyköping (SE); Fredrik Rosenlind, Nyköping (SE); Kristoffer Olsson, Nyköping (SE)

(73) Assignee: Lamiflex Group AB, Nyköping (SE)

( * ) Notice: Subject to any disclaimer, the term of this patent is extended or adjusted under 35 U.S.C. 154(b) by 162 days.

(21) Appl. No.: 17/921,274

(22) PCT Filed: Apr. 30, 2021

(86) PCT No.: PCT/EP2021/061436
§ 371 (c)(1),
(2) Date: Oct. 25, 2022

(87) PCT Pub. No.: WO2021/219861
PCT Pub. Date: Nov. 4, 2021

(65) Prior Publication Data
US 2023/0182940 A1   Jun. 15, 2023

(30) Foreign Application Priority Data

Apr. 30, 2020   (SE) .................................. 2050501-2

(51) Int. Cl.
*B65B 11/04*   (2006.01)
*B25J 9/00*   (2006.01)
(Continued)

(52) U.S. Cl.
CPC ............... *B65B 11/04* (2013.01); *B25J 9/009* (2013.01); *B25J 9/1669* (2013.01); *B25J 9/1682* (2013.01);
(Continued)

(58) Field of Classification Search
CPC ....... B65B 11/04; B65B 25/146; B65B 57/12; B65B 61/06; B65B 27/06
See application file for complete search history.

(56) References Cited

U.S. PATENT DOCUMENTS 3,935,694 A * 2/1976 Langen .................. B65B 49/02
493/131
4,079,565 A * 3/1978 Lancaster, III ....... B65B 11/025
53/556

(Continued)

FOREIGN PATENT DOCUMENTS

DE   1192094 B   4/1965
EP   3 070 008 A1   9/2016

(Continued)

OTHER PUBLICATIONS

Notice and Search report issued in Swedish Patent application No. 2050501-2, dated Dec. 18, 2020.

(Continued)

*Primary Examiner* — Thomas M Wittenschlaeger
*Assistant Examiner* — Katie L Gerth
(74) *Attorney, Agent, or Firm* — MEDLER FERRO WOODHOUSE & MILLS PLLC

(57) ABSTRACT

A robot tool, a robot system and a method for packaging coils of sheet metal. A robot tool for coil packaging, having two ends, each end being provided with a coupling tool piece configured to interface with a robot arm; a roll holder shaft configured to hold a roll of wrapping material, the holder shaft at one end being rotatably mounted substantially midway between said ends and projecting substantially perpendicular to an axis extending between said ends. A robot system for coil packaging, having two industrial robots, each robot being provided with a robot arm having a coupling robot piece configured to interface with a robot tool; and a robot tool, the robot tool having two ends, each (Continued)

end being provided with a coupling tool piece configured to interface with a said robot arm.

17 Claims, 3 Drawing Sheets

(51) Int. Cl.
   *B25J 9/16* (2006.01)
   *B65B 25/14* (2006.01)
   *B65B 57/12* (2006.01)
   *B65B 61/06* (2006.01)

(52) U.S. Cl.
   CPC ............ *B65B 25/146* (2013.01); *B65B 57/12* (2013.01); *B65B 61/06* (2013.01)

(56) References Cited

U.S. PATENT DOCUMENTS

| | | | | |
|---|---|---|---|---|
| 4,204,377 | A * | 5/1980 | Lancaster | B65B 11/045 |
| | | | | 53/399 |
| 4,220,291 | A * | 9/1980 | Papa | B65H 75/2437 |
| | | | | 242/576.1 |
| 4,564,410 | A * | 1/1986 | Clitheros | B05C 5/0216 |
| | | | | 700/95 |
| 4,631,898 | A | 12/1986 | Brambilla | |
| 4,811,891 | A * | 3/1989 | Yamaoka | B23K 37/047 |
| | | | | 228/186 |
| 4,827,598 | A * | 5/1989 | Sakamoto | B62D 65/02 |
| | | | | 29/430 |
| 5,086,983 | A * | 2/1992 | Darrieux | B29C 53/588 |
| | | | | 242/434.8 |
| 5,088,270 | A * | 2/1992 | Diehl | B65B 11/025 |
| | | | | 53/399 |
| 5,183,377 | A * | 2/1993 | Becker | B25J 9/026 |
| | | | | 212/319 |
| 5,372,331 | A * | 12/1994 | Miller | B65H 75/2437 |
| | | | | 242/571.1 |
| 5,379,964 | A * | 1/1995 | Pretto | B65H 75/2437 |
| | | | | 242/571.2 |
| 5,979,823 | A * | 11/1999 | Schlumpf | B65H 75/2437 |
| | | | | 279/2.08 |
| 6,059,218 | A * | 5/2000 | Berube | B65H 75/2437 |
| | | | | 279/2.07 |
| D431,040 | S | 9/2000 | Makabe et al. | |
| D438,220 | S | 2/2001 | Ishibashi et al. | |
| D440,988 | S | 4/2001 | Ishibashi et al. | |
| 6,324,820 | B1 * | 12/2001 | Gelfman | B65B 25/24 |
| | | | | 53/399 |
| 6,334,406 | B1 * | 1/2002 | Eriksson | A01J 5/017 |
| | | | | 119/14.08 |
| D457,900 | S | 5/2002 | Hanne et al. | |
| 6,494,400 | B1 * | 12/2002 | Zitella | B65H 19/12 |
| | | | | 242/559.3 |
| D482,051 | S | 11/2003 | Hanne et al. | |
| 6,705,060 | B1 * | 3/2004 | McGuinness | B65B 25/24 |
| | | | | 53/409 |
| 6,932,263 | B2 * | 8/2005 | Kilabarda | B23K 37/047 |
| | | | | 228/49.1 |
| D748,705 | S | 2/2016 | Sekido et al. | |
| 9,624,070 | B2 * | 4/2017 | Yoshida | B65H 81/00 |
| D810,801 | S | 2/2018 | Hsu et al. | |
| D819,102 | S | 5/2018 | Kobayashi et al. | |
| 9,993,845 | B1 * | 6/2018 | Power | B07C 3/008 |
| 10,370,131 | B2 * | 8/2019 | Quinones | B65B 63/04 |
| D884,757 | S | 5/2020 | Fujii | |
| D980,299 | S | 3/2023 | Järte et al. | |
| 2007/0222245 | A1 | 9/2007 | Maffeis et al. | |
| 2007/0284046 | A1 * | 12/2007 | Habisreitinger | B65B 33/04 |
| | | | | 156/352 |
| 2008/0141626 | A1 * | 6/2008 | Anderson | B65B 11/04 |
| | | | | 53/399 |
| 2008/0229716 | A1 * | 9/2008 | Zitella | B65B 11/025 |
| | | | | 53/461 |
| 2009/0044655 | A1 * | 2/2009 | DeLouis | B25J 17/00 |
| | | | | 403/24 |
| 2009/0308267 | A1 * | 12/2009 | Song | B21C 47/24 |
| | | | | 100/29 |
| 2016/0068210 | A1 * | 3/2016 | Sakamoto | B25B 11/02 |
| | | | | 269/86 |
| 2016/0167724 | A1 * | 6/2016 | Kilibarda | B62D 65/022 |
| | | | | 29/401.1 |
| 2016/0272351 | A1 | 9/2016 | Faehrenkaemper | |
| 2017/0029052 | A1 * | 2/2017 | Jin | B23K 26/032 |
| 2017/0282634 | A1 * | 10/2017 | Jones | B65H 5/08 |
| 2017/0361955 | A1 * | 12/2017 | Luo | B65B 11/06 |
| 2018/0072441 | A1 * | 3/2018 | Tegström | B65B 25/24 |
| 2018/0305123 | A1 * | 10/2018 | Lert, Jr. | G06Q 10/087 |
| 2018/0346243 | A1 * | 12/2018 | Lindbo | B65G 1/065 |
| 2019/0119045 | A1 * | 4/2019 | Vazul | B65G 17/34 |
| 2019/0291901 | A1 * | 9/2019 | Stone | B65B 13/04 |
| 2020/0254711 | A1 * | 8/2020 | Ruhland | B31F 1/20 |
| 2021/0229909 | A1 * | 7/2021 | Austrheim | B61B 13/00 |
| 2022/0212893 | A1 * | 7/2022 | Steenrod | B65B 25/146 |
| 2023/0227188 | A1 * | 7/2023 | Olsson | B65B 11/04 |
| | | | | 53/399 |
| 2024/0051692 | A1 * | 2/2024 | Robèrt | B65B 25/24 |

FOREIGN PATENT DOCUMENTS

| | | |
|---|---|---|
| FR | 2 537 556 A1 | 6/1984 |
| GB | 1014463 A | 12/1965 |
| KR | 10-2011-0137880 A | 12/2011 |
| KR | 10-2019-0047962 A | 5/2019 |
| KR | 102028468 B1 | 10/2019 |
| KR | 10-2020-0035519 A | 4/2020 |
| KR | 10-2020-0074765 A | 6/2020 |
| SK | 279238 B6 | 8/1998 |
| WO | WO-01/70575 A1 | 9/2001 |
| WO | WO-2016/195578 A1 | 12/2016 |
| WO | WO-2020/193868 A1 | 10/2020 |

OTHER PUBLICATIONS

European Search Report for EP Patent Application No. 24153372.8, Issued on Apr. 16, 2024, 9 pages.

* cited by examiner

ROBOT TOOL AND METHOD FOR COIL PACKAGING

CROSS-REFERENCE TO PRIOR APPLICATIONS

This application is a § 371 National Stage Application of PCT International Application No. PCT/EP2021/061436 filed Apr. 30, 2021, which claims priority to Swedish Patent Application No. 2050501-2 filed Apr. 30, 2020, both of which are incorporated herein in their entirety.

TECHNICAL FIELD

In general, the present disclosure relates to apparatus, system and methods for packaging articles with wrapping material. More specifically, the present disclosure relates to a robot tool, system and method for packaging annular articles, such as coils of sheet metal, being rotated while being packaged with a wrapping material.

BACKGROUND

The wrapping of coils of sheet metal is generally time consuming in the production of sheet metal. Different solutions for automatized coil wrapping are available. Although working well, there is a demand for increasing the efficiency in the coil wrapping stage.

RELATED Art

The patent publication WO2016/195578 to Lamiflex shows a setup of linear robots configured for wrapping sheet metal coils.

Another patent publication U.S. Pat. No. 6,705,060B1 to McGuiness shows a similar setup of linear robots configured for wrapping sheet metal coils.

In the patent publication EP3070008A1, also published as US2016272351A1, to Fährenkämper there is shown a setup of robots with more degrees of freedom rendering a more flexible configuration. However, this disclosure lacks the practical solutions to make such a configuration work well in practice.

The patent publication GB1014463A to Allen Larmuth & James Larmuth shows a method and an apparatus for wrapping annular articles. In this publication a roll of wrapping material is moved back and forth between two rams, each being positioned at a respective end of the annular article, to lay out a length of wrapping material on the inside of the end and on the outside of the annular article in consecutive movements.

In the patent publication U.S. Pat. No. 4,631,898A to Brambilla from 1986, there is shown a process and an apparatus for continuous wrapping of palletized load. This piece of related art shows inter alia a wrapping material roll holder with an a mechanically expandable gripping part.

The patent publication US2007222245 A1 to Maffeis from 2007 shows a pneumatically expandable finger gripper.

OBJECT OF DISCLOSED EMBODIMENTS

The object of embodiments disclosed herein is to provide a robot tool, system and method that overcomes the drawbacks of the known related art.

SUMMARY

An important part of embodiments herein is a robot tool for coil packaging, comprising two ends, each end being provided with a coupling tool piece configured to interface with a robot arm; a roll holder shaft configured to hold a roll of wrapping material, the holder shaft at one end being rotatably mounted substantially midway between said ends and projecting substantially perpendicular to an axis extending between said ends.

The robot tool is generally T-shaped and has a symmetric design to allow for an efficient operation and handling by two industrial robots.

BRIEF DESCRIPTION OF DRAWINGS

Embodiments disclosed herein will be further explained with reference to the accompanying drawings, in which.

DESCRIPTION OF EMBODIMENTS

Embodiments described herein are generally applicable in apparatus, system and methods for packaging articles with packaging material. The expressions packaging and packaging material are herein also synonymously used with the expressions wrapping and wrapping material since an article or object that is packaged by means of the disclosed embodiments is wrapped by relative movements of robot arms and/or of the article.

More specific embodiments described herein relate to a robot tool, system and method for packaging annular articles, such as coils of sheet metal, that are rotated while being packaged with a wrapping material. Such embodiments, preferably configured for use in a coil wrapping production line, is shown schematically in FIG. 1A to FIG. 1E.

Embodiments of a Robot Tool

Figure 1A:
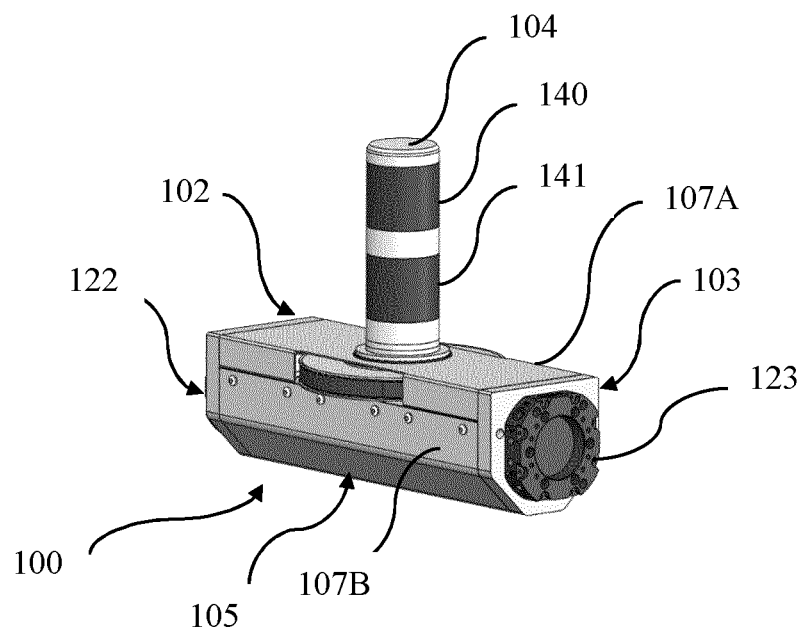
FIG. 1A illustrates schematically an embodiment of a robot tool provided with a roll holder shaft for holding a roll of wrapping material and being configured for handover between robot arms of coordinated robots.
Figure 1B:
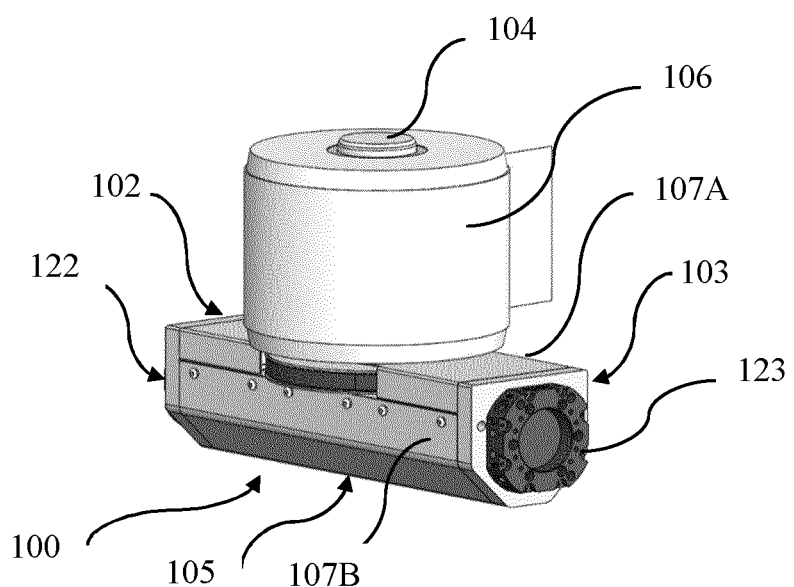
FIG. 1B illustrates schematically the embodiment of the robot tool shown in FIG. 1A with a roll of wrapping material placed on the roll holder shaft.
Figure 1C:
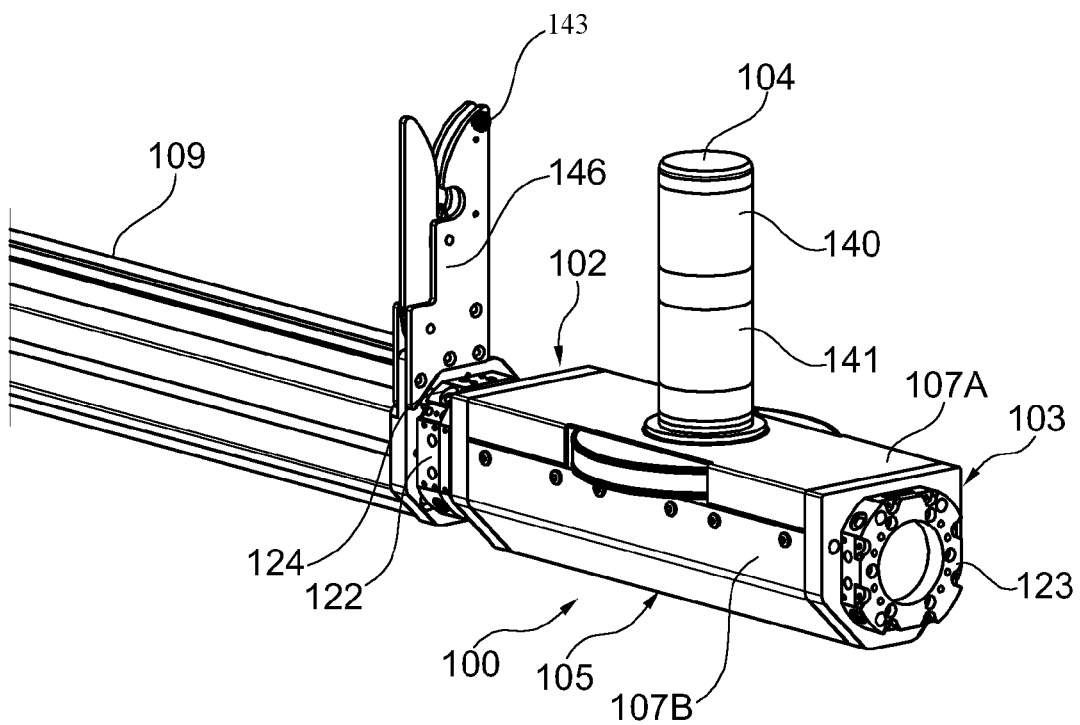
FIG. 1C illustrates schematically the embodiment of the robot tool shown in FIG. 1A and FIG. 1B coupled to a robot arm at one side or end of the robot tool.
Figure 1D:
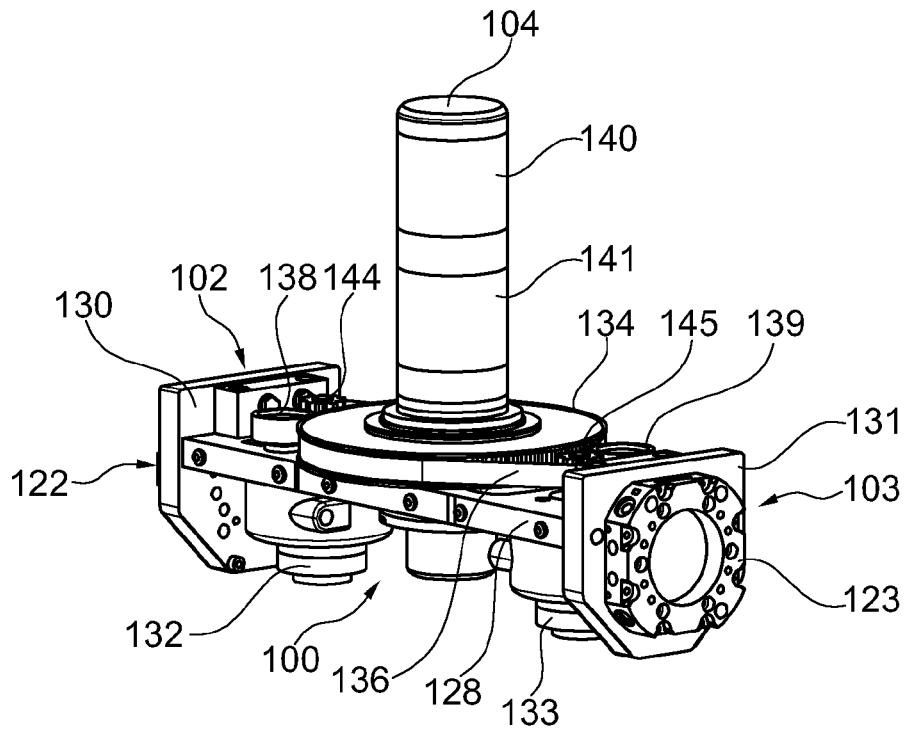
FIG. 1D illustrates schematically an embodiment of the robot tool shown in FIG. 1A-FIG. 1D in more detail.

FIG. 1A to FIG. 1E illustrate schematically an embodiment of a robot tool 100 provided with a roll holder shaft 104 for holding a roll 106 of wrapping material and being configured for handover between robot arms 108,109 of coordinated industrial robots 112,113 (Cf. FIG. 1D).

General embodiments of a robot tool 100 for coil packaging, comprises two, preferably opposing, ends 102,103 with each end being provided with a coupling tool piece 122,123 configured to interface with a robot arm 108,109. This embodiment further comprises a roll holder shaft 104 configured to hold a roll 106 of packaging material, the holder shaft 104 at one end being rotatably mounted substantially midway between said, preferably opposing, ends 102,103 and projecting substantially perpendicular to an axis extending between said, preferably opposing, ends 102,103. The robot tool 100 may be provided with a housing 105 comprising one or more cover plates 107A,107B.

In preferred embodiments the two ends are substantially mutually opposing ends, and the coupling tool pieces are preferably mounted on the respective ends such that the robot tool is substantially symmetrical. In other embodiments of the robot tool, the coupling tool pieces may be arranged in other configurations.

FIG. 1B illustrates schematically the embodiment of the robot tool shown in FIG. 1A with a roll 106 of wrapping material placed on the roll holder shaft 104.

FIG. 1C illustrates schematically the embodiment of the robot tool shown in FIG. 1A and FIG. 1B coupled to a robot arm 108,109 (109 shown in FIG. 1C) at one side or end 102 of the robot tool 100. Embodiments of the robot arm 108,109 is provided with a coupling robot piece 124,125 for example a gripper or a master piece of a tool changer, configured to be able to grip or mate with a coupling tool piece 122,123 of the robot tool 100. As shown in the embodiment of FIG. 1C, a robot arm 109 is coupled to the robot tool 100 via a coupling robot piece 124 that is mated with the robot tool piece 122 to the left in FIG. 1C at one end 102. At an other end 103 of the robot tool 100, to the right in FIG. 1C, a second coupling tool piece 123 is available for coupling to another robot arm 108 not shown in FIG. 1C.

FIG. 1D illustrates schematically an embodiment of the robot tool shown in FIG. 1A-FIG. 1C in more detail and without the cover of the housing 105 shown in FIG. 1A to FIG. 1C. In the embodiment of FIG. 1D, the robot tool 100 comprises a carrier piece 128 with an end piece 130,131 attached to the carrier piece 128 at the respective ends 102,103 of the robot tool 100. Coupling tool pieces 122, 123 are attached to the end pieces 130,131 at the respective, preferably opposing, ends 102,103 of said carrier piece 128. Thus, in embodiments there is comprised a carrier piece 128 where the coupling tool pieces 122,123 are each mounted at the respective ends of the carrier piece 128.

The coupling tool pieces 122,123 are configured to be able to convey actuating power from a power supply line of a robot, such as an industrial robot. The actuating power may in different embodiments for example be in the form of pneumatic power, hydraulic power or electric power. In embodiments as illustrated FIG. 1A to FIG. 1D, the actuating power is preferably pneumatic power. The coupling may typically be configured to be couplable by a bayonet coupling and/or locked in position by means of actuation power controlled by the respective robots.

In embodiments the coupling configured for interfacing between the industrial robots and the robot tool is configured in the form of a robot tool changer with the coupling tool piece 122,123 configured to be able to mate with a coupling master piece 124, 125 of said tool changer mounted on a respective robot arm. Said couplings are preferably configured with a presence sensor adapted to detect or indicate that the robot tool is attached to the robot arm. In embodiments the presence sensor may be integrated in the tool changer functionality of the coupling and be based on pneumatic or electric signals that are readable by the robot control system. In other embodiments, such a presence sensor is devised at the side of the coupling, for example in the form of an electric presence detector coupled to the robot control system.

In embodiments of the robot tool, and shown in FIG. 1A-FIG. 1D, the roll holder shaft 104 further comprises a roll fixture 140,141 configured to releasably fix a roll of wrapping material to said roll holder shaft. For example, a portion 140,141 of the roll holder shaft is configured to be radially expandable to enable a roll fixture to releasably fix a roll of wrapping material to said roll holder shaft. In embodiments, this is implemented as one or more inflatable bladders 140,141 that are controllably inflatable by means of pneumatic power, i.e. pressurized air, conveyed from the respective robots via the coupling interfaces. In other embodiments, the roll fixture 140,141 is actuatable for example by electric or hydraulic power. An embodiment comprises a first and a second radially expandable portions 140, 141 in the form of inflatable bladders on the shaft such that the first expandable portion is configured to fix a roll of wrapping material having a first lesser wideness and such that the combined first and second expandable portions are configured to fix a roll of wrapping material having a larger wideness.

Figure 1E:
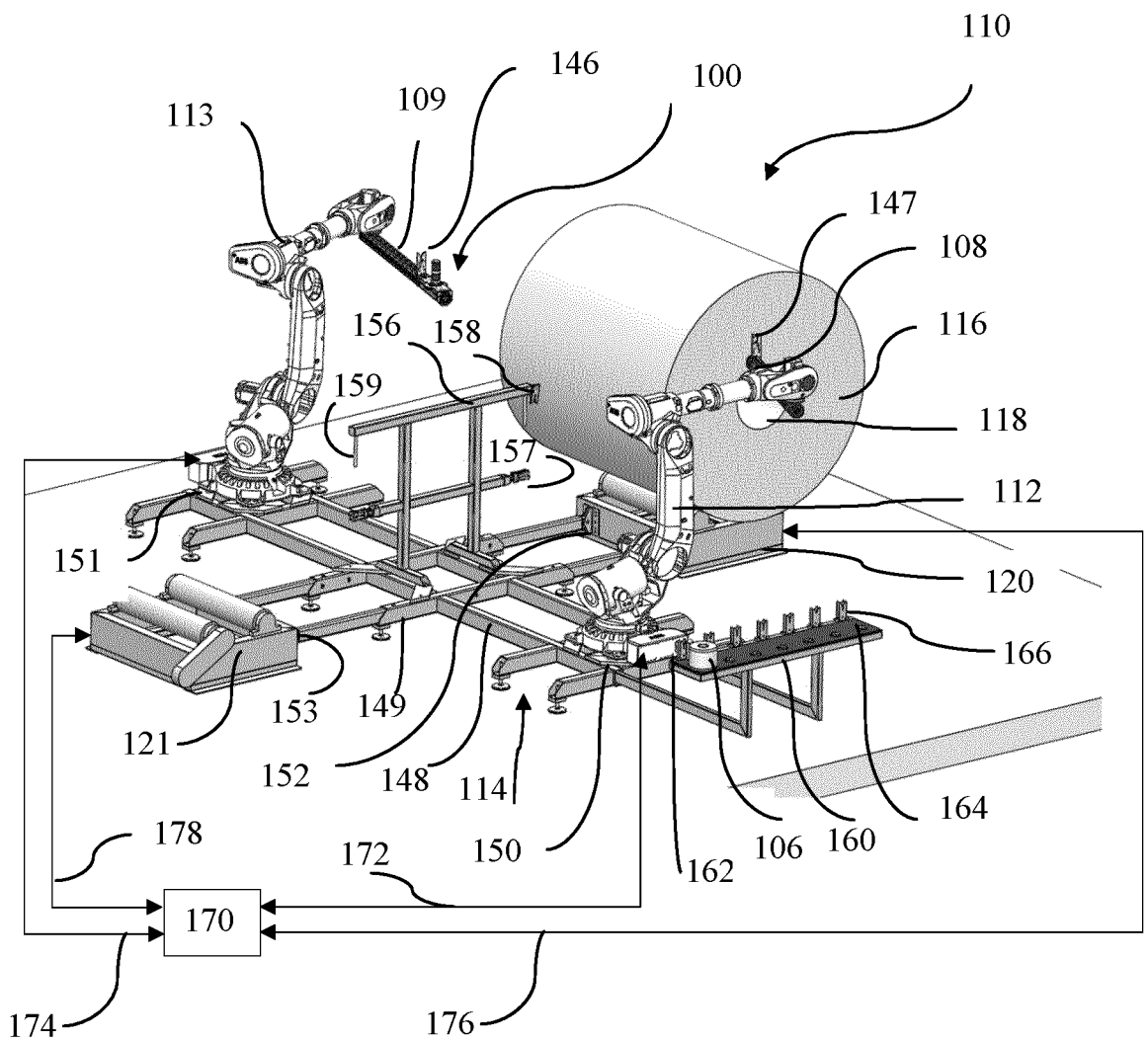
FIG. 1E illustrates schematically an embodiment of a robot system comprising an embodiment of the robot tool shown in FIG. 1A to FIG. 1D and configured to wrap a rotating annular object, e.g. a coil of sheet metal.

Embodiments of the robot tool 100 further comprises at least one motor 132,133 configured to be able to drive, prevent and/or brake rotation of the roll holder shaft. As shown in the embodiment of FIG. 1E, a pneumatic motor 132,133 is mounted on the carrier piece 128 at each side of the roll holder shaft 104. The roll holder shaft 104 is provided with a sprocket 134 configured to be engaged by a toothed belt 136. The toothed belt 136 is also engaged with sprockets 144,145 coupled to the respective motor 132,133 and is biased by tension wheels 138,139 preferably mounted as backside idlers on the toothed belt 136. This enables driving the roll holder shaft 114 in first rotational direction e.g. forwards, for example to roll out wrapping material from the roll in synchronization with the movement of the robots, or in a second rotational direction e.g. backwards, for example to roll up or in wrapping material onto the roll in order gather superfluous wrapping material or increase the tension of the wrapping material. It further enables prevention of rotation of the roll, for example in order to keep a rolled out strip of wrapping material at a certain length or to keep a current tension of the wrapping material. Further, it enables braking the rotation of the roll, for example in order to obtain, vary or keep a certain tension in the roll.

The embodiments of the robot tool shown in FIG. 1A-FIG. 1D have a basically symmetrical configuration. When a first robot arm is coupled to the robot tool 100 at, for example, the right side of the tool (in FIG. 1D) to the coupling tool piece 123, the motor 133 and the roll fixture 140,141 are actuated by means of pneumatic power, i.e. pressurized air, supplied from the first robot arm (or first robot) via the coupling tool piece 123. When a second robot arm is coupled to the robot tool at the left side of the tool to the coupling tool piece 122, the motor 132 and the roll fixture 140,141 are actuated by means of pneumatic power from the second robot arm via the coupling tool piece 122. During a phase, typically a handover phase, when the first robot and the second robot are both engaged with the robot tool, the motors 132, 133 and roll fixture 140,141 are simultaneously actuated or actuatable by the respective first and second robots. In other embodiments, the motors 132, 133 and/or the roll fixture 140,141 are actuatable for example by electric or hydraulic power.

An embodiment of a robot tool for coil wrapping, comprises:
   a carrier piece having two opposing ends, each end being provided with a tool piece of a robot tool changer configured to interface by mating with a corresponding master piece of a tool changer of a robot arm;
   a roll holder shaft configured to hold a roll of wrapping material, the holder shaft at one end being rotatably mounted on said carrier piece substantially midway between said opposing ends and projecting substantially perpendicular to an axis extending between said opposing ends; wherein:

the tool changers are configured to be able to convey actuating pneumatic power from a pneumatic power supply line of a robot when mated;

wherein a portion of the roll holder shaft is configured to be radially expandable by said pneumatic power to enable a roll fixture to releasably fix a roll of wrapping material to said roll holder shaft;

at least one pneumatic motor is mounted on the carrier piece, coupled to said roll holder shaft and configured to be able to drive,prevent and/or brake rotation of said roll holder shaft by said pneumatic power.

Embodiments of a Robot System

FIG. 1E illustrates schematically an overview of an embodiment of a robot system 110, in this example comprising an embodiment of the robot tool shown in FIG. 1A to FIG. 1D, and configured to wrap a rotating annular object, e.g. a coil of sheet metal 116. Embodiments of the robot system 110 may be configured to operate with other embodiments of the robot tool.

Embodiments of a robot system for coil packaging, comprises: a. two industrial robots 112,113, each robot being provided with a robot arm 108,109 having a coupling robot piece 124,125 (125 not shown in FIGs) configured to interface with a robot tool, and b. a robot tool 100. The robot tool 100 having two ends 102,103, each end being provided with a coupling tool piece 122,123 configured to interface with a said robot arm 108,109, and a roll holder shaft 104 configured to hold a roll of packaging material 106. The roll holder shaft 104 at one end being rotatably mounted substantially midway between said ends 102,103 and projecting substantially perpendicular to an axis extending between said ends 102,103.

In embodiments of the robot system, the robot arm 108,109 is configured as an elongate beam having said coupling robot piece 124,125 mounted at the end of the beam. The coupling robot pieces 124, 125 are configured to be able to convey actuating power from a power supply line of any of said robots. As mentioned above, the actuating power is in preferred embodiments compressed air in a pneumatic system. In other embodiments, the actuating power may for example be electric power or hydraulic power. In embodiments, the coupling between said robots 112,113 and said robot tool 100 is in the form of a robot tool changer with the coupling tool pieces 122,123 of the robot tool 100 configured to be able to mate with coupling master piece 124,125 mounted on each robot arm 108,109.

As shown in FIG. 1C, the robot arms 108,109 each comprises a wrapping material clamp 146,147 configured to hold a strip of wrapping material, preferably mounted close to the distal end of said robot arm 108,109.

Embodiments of the robot system 110, further comprises: a robot jig 114 having a first 148 and possibly a second 149 intersecting leg. A first leg 148 of the robot jig 114 is configured with a first 150 and a second 151 robot base mounts placed apart on said first leg 148. Embodiments comprises a second leg 149 of the robot jig 114 is configured with a first coil roller abutment 152 placed at an end of said second leg 149. In some embodiments, the place for a coil roller is positioned in relation to the robot jig, for example with the aid of positioning beams e.g. with abutments. In such embodiments the coil roller are meant not to be in physical or mechanical contact during operating in order to avoid dynamical forces to be conveyed to the robot jig.

Embodiments of the robot system further comprises a first coil roller 120 configured to give a coil 116 placed in said first coil roller 120 a rotating movement. In embodiments configured with two coil stations, and as shown in FIG. 1E, the robot jig 114 at its second leg 149 further comprises a second coil roller abutment 153 placed at the other end of said second leg 149. Such embodiments further comprise a second coil roller 121 configured to give a coil (not shown) placed in said second coil roller 121 a rotating movement.

The robot jig 114 in the shown embodiments is thus configured with two robot base mounts 150,151 placed apart on a first leg of the cross geometry as well as a first and a second coil roller abutment 152,153 placed apart on a second leg of the cross geometry. A first 112 and a second 113 industrial robots are mounted on the respective robot base mounts 150,151. A first 120 and a second 121 coil roller are placed to the respective coil roller abutments 152,153. Such coil rollers 120,121 are per se known and typically comprises a cradle of two rollers that are actuatable to give a coil placed in the cradle a rotating movement. An annular article schematically illustrating a coil of sheet metal 116 with a hollow cylindrical center core 118 is placed on the first coil roller 120. Each of the industrial robots 112, 113 comprises a robot arm 108,109 configured to be couplable to a robot tool 100 at each end.

Coils of sheet metal appear in different sizes. A large coil may have a length of 2300 mm, normal sizes are in the range of 1200 to 1500 mm length and down to a minimum that may be 800 mm length. The hollow center core often has an inner diameter of 508 or 610 mm, and there are diameters as small as 420 mm. The outer diameter of a coil may vary from for example 1 to 2.5 meters.

In the embodiment shown in FIG. 1E, the robot jig 114 is configured with a general cross geometry of substantially perpendicular legs with one or more bars, i.e. the bars making up the legs and thus the one or more bars intersecting at substantially right angles. Other intersecting angles may be configured with adapted configurations of the robots, their range and their movements. In the shown embodiment visible in FIG. 1E, each leg comprises two parallel bars. Other embodiments include only a first leg as described above.

Embodiments of the robot system, further comprises a wrapping material clamping station 156 placed within reach of at least one robot arm, for example placed substantially midway between said robots 112,113, said wrapping material clamping station 156 is provided with one or more wrapping material clamps 157,158 configured to hold a strip of wrapping material. The wrapping material clamping station 156 is in embodiments preferably placed substantially at the intersection of said first and second legs 148,149 of the robot jig 114 for example substantially midway between said robot base mounts 150,151, said wrapping material clamping station 156 being provided with one or more wrapping material clamps 157,158 configured to hold a strip of wrapping material.

In embodiments, the robot system further comprises a roll magazine 160 for storing a plurality of rolls 106 of wrapping material available to one or more of the robots. The roll magazine 160 is configured with one or more roll places 164 and an associated wrapping material clamp 162,166 for each roll of wrapping material, said wrapping material clamps 162,166 being configured to hold a strip of wrapping material. The roll magazine is in use positioned and placed within reach of at least one of the robots, for example at the side of the robot setup or in front of one of the robots e.g. at the side of the coil roller.

Embodiments of the robot system further comprises a measuring system configured to measure the position and dimensions of a coil 116 positioned on a coil roller 120,121 for being packaged with wrapping material. In embodiments, the measuring system comprises one or more laser measuring tools 140, for example mounted on one of or both robot arms 108,109 (Cf. FIG. 1C). With such a laser measuring tool mounted on the robot arm, it is preferable that it is positioned such that is has an optical line that is unobstructed by a roll of wrapping material attached to the robot tool. When measuring the position and dimensions, the robot system is configured to find the center of the coil, follow the contours and calculate the position and the dimensions.

The robot system, in embodiments further comprises a robot control system 170 configured to control the movement of the robots 112,113 in relation to a coil 116 positioned on a coil roller 120,121 in the robot system for being packaged with a wrapping material. The robot control system comprises input/output interfaces configured to be communicatably couplable to the industrial robots 112,113, to one or more coil rollers 120,121, and/or to a human/machine interface (not shown) for example in the form of a GUI generating a dashboard.

The above described components of the robot system for coil packaging, i.e. the robot tool, the configuration of industrial robots and the robot jig, may be used independently together with other variations of system components.

Embodiments of Method for Coil Wrapping

In an overview of operation during a wrapping sequence, a first robot 112 with a first robot arm 108 coupled to a first side of the robot tool 100 carries the robot tool 100 loaded with a roll 106 of wrapping material, inserts the robot tool into the cylindrical center core 118 to a position where the second robot with the second robot arm 109 couples to the second side of the robot tool 100. The robot tool 100 is handed over to the second robot 112 which in its turn transports the robot tool 100 out of the center core 118 along the base of the cylindrical coil 116 and along its envelope surface all while the wrapping material is unfolding or reeling up from the wrapping material roll 106. The robot tool 100 is then handed over from the second robot 113 back to the first robot 112, and the cycle is repeated. During the wrapping cycle the coil roller 120 is rolled in a tempo coordinated with the movements of the robots to achieve an overlapping wrapping of the coil 116.

Embodiments of a method of coil packaging in a wrapping station with a robot system as described above, comprises a selection of:

Placing a coil of sheet metal on a coil roller associated with a robot system for coil packaging.

Typically, the coil of sheet metal is transported from the manufacturing line to the wrapping station by means of an overhead crane or other crane or fork-lift.

Measuring the position of the coil in relation to the industrial robots.

Once a coil is placed in the wrapping station and a wrapping operation is started, the position of the coil is measured by the measuring system. In embodiments, this is carried out by one or both robots scanning the contours of the coil by means of the laser measuring tool 140.

Measuring the dimensions of the coil.

In conjunction with the position measuring or as a separate phase the dimensions of the coil is measured. Similarly in embodiments, the dimension measuring is carried out by one or both robots scanning the contours of the coil by means of the laser measuring tool 140.

Attaching a first turn of wrapping material rolled off from a roll of wrapping material attached to a robot tool.

In order to fasten the first turn of wrapping material, an end strip of the wrapping material is fastened to one of the wrapping material clamps 157,158 on the wrapping material clamping station 156. With the end strip held in clamp, the first robot 112 holding the robot tool loaded with the roll of wrapping material moves the robot tool along the envelope surface of the coil, along the first side of the coil and into the hollow cylindrical center core of the coil all while the wrapping material unfolds or rolls off from the roll 106. Inside the center core, the second robot 113 with its robot arm couples to the robot tool in a first handover phase. The first robot releases the robot tool and moves back out of the hollow center core and up in front of the envelope surface of the coil to prepare for a second handover phase. Meanwhile, the second robot 113 now holding the robot tool with the roll of wrapping material moves out of the hollow center core, along the second side of the coil and along the envelope surface of the coil. The first robot 112 again engages and couples to the robot tool 100 and moves together with the second robot in a second handover phase until the second robot releases the robot tool 100. In this first fastening sequence, the second turn of wrapping material overlaps with the first turn and locks the wrapping material. The clamped end strip is then released from the wrapping material clamp.

The handover phases may for example last in the order of ½ to 5 seconds during a coordinated movement where the robot tool is displaced about 5 to 30 centimeters, preferably close to 15 cm.

Wrapping the coil in a sequence of robot movements with handover of the robot tool with the roll of wrapping material from the first industrial robot 112 to the second industrial robot 113; wherein a first handover phase takes place in the hollow cylindrical center core if the coil and a second handover phase takes place along an envelope surface of the coil.

The robots 112,113 continues the wrapping movement as described in the previous section. The coil roller maintains a rolling movement of the coil such that each turn of wrapping material on one hand partly overlap with the previous turn and on the other hand.

Finishing the wrapping by clamping a strip of the wrapping material and cutting the strip of wrapping material.

When the coil has been fully wrapped, a strip of the wrapping material is clamped in the clamping station 156 and the strip is cut. For the purpose of cutting the wrapping material, a strip of the wrapping material is turned around a shaft 159 at the clamping station 156, in order to keep track of where the wrapping material is in the robot space, and thereafter the strip is cut. Before cutting the strip of wrapping material, the strip is also held by the clamp 146,147 of one of the robot arms 108,109 so that the remaining wrapping material on a roll 106 on the robot tool is ready for a new wrapping procedure. A lose end strip of the wrapping material turned around the coil is preferably arranged to tack to the wrapping by self-adhesive properties. The wrapping material is usually a stretch film in a plastic material After the wrapping operation in the wrapping station a crane or similar is used to lift out the wrapped coil to an after-processing station where supplementing packing operations are carried out manually or semi-automatically.

The invention claimed is:

1. A robot tool for coil packaging, comprising
two opposing end faces, each end face being provided with a coupling tool piece, wherein each coupling tool piece is configured to interface with a robot arm of an industrial robot in a direction of an axis extending between said opposing end faces to allow for coupling of the robot tool to the robot arm in the direction of the axis extending between said opposing faces and wherein the coupling tool piece is configured to convey actuating power from a power supply line of the industrial robot to the robot tool;
a roll holder shaft configured to hold a roll of wrapping material, the holder shaft at one end being rotatably mounted substantially midway between said opposing ends and projecting substantially perpendicular to the axis extending between said opposing ends; and
at least one motor configured to be able to drive, prevent and/or brake rotation of the roll holder shaft by said actuating power.

2. The robot tool of claim 1, further comprising a carrier piece where the coupling tool pieces are each mounted at the respective ends of said carrier piece.

3. The robot tool of claim 1, comprising a coupling in the form of a robot tool changer with the coupling tool piece configured to be able to mate with a coupling master piece of said tool changer mounted on the robot arm.

4. The robot tool of claim 1, further being configured to enable driving the roll holder shaft in a first rotational direction and in a second rotational direction.

5. The robot tool of claim 1, wherein a portion of the roll holder shaft is configured to be radially expandable by said actuating power to enable a roll fixture to releasably fix a roll of wrapping material to said roll holder shaft.

6. The robot tool of claim 1, further comprising a first and a second radially expandable portions in the form of inflatable bladders on the shaft such that the first expandable portion is configured to fix a roll of wrapping material having a first lesser wideness and such that the combined first and second expandable portions are configured to fix a roll of wrapping material having a larger wideness.

7. A robot system for coil packaging, comprising:
two industrial robots, each of the robots being provided with a robot arm having a coupling robot piece configured to interface with a robot tool, said coupling robot pieces being configured to be able to convey actuating power from power supply lines of said industrial robots;
the robot tool has two opposing ends, each of the opposing ends being provided with a coupling tool piece configured to interface with said robot arm in a direction of an axis extending between said opposing ends to allow for coupling of the robot tool to the robot arm in the direction of the axis extending between said opposing ends and configured to be able to convey actuating power from power supply lines of said industrial robots, a roll holder shaft configured to hold a roll of packaging material, the roll holder shaft at one end being rotatably mounted substantially midway between said opposing ends and projecting substantially perpendicular to the axis extending between said opposing ends, and at least one motor configured to be able to drive, prevent and/or brake rotation of the roll holder shaft by said actuating power.

8. The robot system of claim 7, wherein each of said robot arms is configured as an elongate beam having said coupling robot pieces mounted at the end of the respective beam.

9. The robot system of claim 7, wherein the coupling between said robots and said robot tool is in the form of a robot tool changer with the coupling tool pieces of the robot tool configured to be able to mate with coupling master pieces mounted on each robot arm.

10. The robot system of claim 7, wherein the robot arms each comprises a wrapping material clamp configured to hold a strip of wrapping material.

11. The robot system of claim 7, further comprising a first coil roller configured to give a coil placed in said first coil roller a rotating movement.

12. The robot system of claim 7, further comprising a second coil roller configured to give a coil placed in said second coil roller a rotating movement.

13. The robot system of claim 7, further comprising a wrapping material clamping station placed substantially midway between said robots, said wrapping material clamping station being provided with a wrapping material clamp configured to hold a strip of wrapping material.

14. The robot system of claim 7, further comprising a roll magazine for storing a plurality of rolls of wrapping material available to one or more of the robots, the roll magazine being configured with a roll place and an associated wrapping material clamp for each roll of wrapping material, said wrapping material clamps being configured to hold a strip of wrapping material.

15. The robot system of claim 7, further comprising a measuring system configured to measure the position and dimensions of a coil positioned on a coil roller for being packaged with a wrapping material.

16. The robot system of claim 7, further comprising a robot control system configured to control the movement of the robots in relation to a coil positioned on a coil roller for being packaged with a wrapping material.

17. A method of coil packaging in the robot system of claim 7, comprising a selection of:
placing a coil of sheet metal on a coil roller associated with a robot system for coil packaging;
measuring the position of the coil in relation to the industrial robots;
measuring the dimensions of the coil;
attaching a first turn of wrapping material rolled off from a roll of wrapping material attached to the robot tool;
wrapping the coil in a sequence of robot movements with handover of the robot tool with the roll of wrapping material from a first industrial robot to a second industrial robot, wherein a first handover phase takes place in a hollow cylindrical center core if the coil and a second handover phase takes place along an envelope surface of the coil, and wherein both the first and second handover is performed substantially in the direction of an axis extending between the opposing ends of the robot tool and by coupling and releasing the coupling tool piece of the respective opposing ends configured to interface with a robot arm of an industrial robot in the direction of the axis extending between said opposing ends;
finishing the wrapping by clamping a strip of the wrapping material and cutting the strip of wrapping material.

* * * * *